US 8,873,512 B2

(12) United States Patent
Richardson et al.

(10) Patent No.: US 8,873,512 B2
(45) Date of Patent: Oct. 28, 2014

(54) MOBILITY IN A WIRELESS ENTERPRISE NETWORK

(71) Applicant: Airvana LLC, Chelmsford, MA (US)

(72) Inventors: Andrew Richardson, Newmarket (GB); Nagi Jayaraman Mahalingam, Cambridge (GB)

(73) Assignee: Airvana LP, Chelmsford, MA (US)

( * ) Notice: Subject to any disclaimer, the term of this patent is extended or adjusted under 35 U.S.C. 154(b) by 0 days.

(21) Appl. No.: 13/776,427

(22) Filed: Feb. 25, 2013

(65) Prior Publication Data

US 2013/0171996 A1 Jul. 4, 2013

Related U.S. Application Data

(63) Continuation of application No. 12/797,138, filed on Jun. 9, 2010, now Pat. No. 8,385,291.

(60) Provisional application No. 61/185,757, filed on Jun. 10, 2009.

(51) Int. Cl.
*H04W 36/00* (2009.01)
*H04W 24/02* (2009.01)
*H04W 36/34* (2009.01)

(52) U.S. Cl.
CPC .............. *H04W 36/34* (2013.01); *H04W 24/02* (2013.01); *H04W 36/0083* (2013.01)
USPC .......................................... 370/331; 455/436

(58) Field of Classification Search
None
See application file for complete search history.

(56) References Cited

U.S. PATENT DOCUMENTS

| 8,208,382 | B2 | 6/2012 | Jerbi et al. | |
|---|---|---|---|---|
| 8,385,291 | B2 * | 2/2013 | Richardson et al. | 370/331 |
| 2004/0224696 | A1 * | 11/2004 | Korneluk et al. | 455/449 |
| 2005/0272425 | A1 * | 12/2005 | Amerga et al. | 455/436 |
| 2008/0031155 | A1 * | 2/2008 | Korus et al. | 370/254 |
| 2008/0220795 | A1 | 9/2008 | Bose et al. | |
| 2008/0316951 | A1 * | 12/2008 | Zeng et al. | 370/312 |
| 2008/0316997 | A1 * | 12/2008 | Zeng et al. | 370/351 |
| 2008/0317047 | A1 | 12/2008 | Zeng et al. | |
| 2009/0047960 | A1 * | 2/2009 | Gunnarsson et al. | 455/436 |
| 2009/0047968 | A1 * | 2/2009 | Gunnarsson et al. | 455/446 |
| 2009/0092081 | A1 | 4/2009 | Balasubramanian et al. | |
| 2009/0132675 | A1 * | 5/2009 | Horn et al. | 709/207 |
| 2010/0008323 | A1 | 1/2010 | Deshpande et al. | |
| 2010/0113021 | A1 * | 5/2010 | Vare et al. | 455/436 |
| 2010/0113032 | A1 | 5/2010 | Lee et al. | |

(Continued)

OTHER PUBLICATIONS

Bender, et al., "CDMA/HDR: A Bandwidth-Efficient High-Speed Wireless Data Service for Nomadic Users", IEEE Communications Magazine, Jul. 2000.

(Continued)

*Primary Examiner* — Hassan Phillips
*Assistant Examiner* — Duc Duong
(74) *Attorney, Agent, or Firm* — Fish & Richardson P.C.

(57) ABSTRACT

A method for configuring a network is described, the method comprising: receiving, from a first radio node in the network, network information associated with one or more second radio nodes in the network; generating a network relation table, the network relation table comprising network information associated with the first radio node and the one or more second radio nodes; and performing a handoff to a third radio node in the network using the network relation table.

20 Claims, 5 Drawing Sheets

(56) References Cited

U.S. PATENT DOCUMENTS

| | | | |
|---|---|---|---|
| 2010/0120394 A1 | 5/2010 | Mia et al. | |
| 2010/0130212 A1 | 5/2010 | So et al. | |
| 2010/0246480 A1 | 9/2010 | Aggarwal et al. | |
| 2010/0260068 A1 | 10/2010 | Bhatt et al. | |
| 2010/0278118 A1* | 11/2010 | Gossain et al. | 370/329 |
| 2010/0278141 A1* | 11/2010 | Choi-Grogan et al. | 370/331 |
| 2010/0303005 A1* | 12/2010 | Gossain et al. | 370/328 |
| 2010/0315974 A1 | 12/2010 | Richardson et al. | |
| 2011/0021240 A1 | 1/2011 | Hiltunen et al. | |
| 2011/0286429 A1 | 11/2011 | Vikberg et al. | |
| 2012/0147780 A1 | 6/2012 | Gossain et al. | |
| 2012/0236792 A1* | 9/2012 | Brownrigg et al. | 370/328 |
| 2014/0087732 A1* | 3/2014 | Matsuo et al. | 455/436 |

OTHER PUBLICATIONS

3GPP2, "Draft Baseline Text for 1xEV-DO," Aug. 21, 2000.

TIA/EIA/IS-2001, "Interoperability Specification (IOS) for CDMA2000 Network Access Interfaces," May 2000.

TIA/EIA/TSB-115, "Wireless IP Architecture Based on IETF Protocols," Jun. 6, 2000.

TIA/EIA/IS-835, "Wireless IP Network Standard," 3rd Generation Partnership Project 2 (3GPP2), Version 1.0, Jul. 14, 2000).

"CDMA2000 High Rate Packet Data Air Interface Specification", 3GPP2 C.S0024-0, Version 4.0, Oct. 25, 2002.

TIA/EIA/IS-856, "CDMA2000 High Rate Packet Data Air Interface Specification", 3GPP2 C.S0024-A, Version 2.0, Jun. 2005.

* cited by examiner

MOBILITY IN A WIRELESS ENTERPRISE NETWORK

CLAIM OF PRIORITY

This application is a continuation of and claims priority under 35 U.S.C. §120 to U.S. application Ser. No. 12/797,138, filed on Jun. 9, 2010, to be issued on Feb. 26, 2013 as U.S. Pat. No. 8,385,291, which in turn claims priority under 35 U.S.C. §119(e) to provisional U.S. Patent Application No. 61/185,757, filed on Jun. 10, 2009, the entire contents of each of which are hereby incorporated by reference.

BACKGROUND 3G ("third generation") networks are widely deployed networks that provide users with a wide range of wireless services including wireless voice telephone, video calls, and broadband wireless data. Examples of 3G technologies include code division multiple access ("CDMA") 2000, Wideband Code Division Multiple Access (WCDMA), High Speed Packet Access (HSPA) and Evolution-Data Optimized ("EVDO"), which was originally referred to as High Data Rate ("HDR"). CDMA and EVDO refer to the same 3G technology but represent various evolutions of the 3G technology. WCDMA and HSPA refer to the same 3G technology but represent various evolutions of the 3G technology.

The CDMA standard is used for high-speed data-only services. CDMA has been standardized by the Telecommunication Industry Association ("TIA") as TIA/EIA/IS-856 (see "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification," 3GPP2 C.S0024-A, Version 2.0, June 2005, and is also incorporated herein by reference).

The Universal Mobile Telecommunications Standard (UMTS) is used for both voice and high-speed data services. UMTS is a globally applicable set of technical specifications and technical reports for a 3G mobile system supporting UTRA Frequency Division Duplex (FDD) and Time Division Duplex (TDD), Global System for Mobile Communication (GSM) including General Packet Radio Service (GPRS), Enhanced Data Rates for GSM Evolution (EGDE) and Long Term Evolution (LTE). The UMTS standards are published and maintained by 3GPP which is also incorporated herein by reference.

The EVDO standard is used for the wireless transmission of data through radio signals, using multiplexing techniques including CDMA to maximize both individual user's throughput and the overall system throughput. EVDO was designed as an evolution of the CDMA 2000 standard that would support high data rates and could be deployed alongside a wireless carrier's voice services. Initially, the EVDO standard was named High Data Rate (HDR), but was renamed to EVDO after the standard was ratified by the International Telecommunication Union ("ITU"). (See P. Bender, et al., "CDMA/HDR: A Bandwidth-Efficient High-Speed Wireless Data Service for Nomadic Users," IEEE Communications Magazine, July 2000; and Third Generation Partnership Project 2 ("3GPP2"), "Draft Baseline Text for 1xEV-DO," Aug. 21, 2000).

Advances in telecommunications technology have brought forth a newly developed class of technologies referred to as 4G ("fourth generation"). Examples of 4G technology include Long-Term Evolution ("LTE") and Worldwide Interoperability for Microwave Access ("WiMAX") telecommunications technologies. Generally, 3G networks, such as EVDO, have wide deployment. 4G networks, such as WiMAX and LTE, are deployed in a limited area (concentrated in larger cities, for example) and often have limited coverage area.

In telecommunications, the term handover or "handoff" refers to the process of transferring an ongoing call or data session from one radio node connected to a core network, for example using 3G or 4G technology, to another radio node. Generally, a "hard handoff" is one in which a communication with a radio node in a source cell is released and then the communication in a target cell is engaged. Thus, the connection to the source cell is broken before the connection to the target cell is established. A "soft handoff" is one in which the communications in the source cell are retained and are used in parallel with communications in the target cell. In a soft handoff, the connection to the target cell is established before the connection to the source cell is broken. A soft handoff may involve using connections to more than two cells, e.g., connections to three, four or more cells can be maintained by one handset at the same time.

Home base-stations, which are also referred to as "femto cells," may be deployed in residences, in public hot-spot areas and in enterprises, e.g., company buildings or campuses, to provide wireless coverage using 3G and 4G technologies. With public hot-spot and enterprise deployments, femto cells are deployed as a connection of radio nodes that allow a handset to maintain a call while travelling through the physical domain of the enterprise. In order to maintain the call in current systems, an engineer or technician selects cell sites, puts up towers, designates one cell as a central controller, and configures the central controller to control mobility from one cell to another. Based on this manual configuration, as the handset transitions from one node to another, the call is maintained using one or more soft handovers.

The description uses the following acronyms:
HNB—Home Node B (e.g., a home base station)
CSG—Closed Subscriber Group
CSG Id—CSG Identifier, which includes a numerical identifier ("Id"). A CSG HNB advertises a CSG Id so that handsets with membership at the HNB can access the CSG. A HNB broadcasts its CSG Id in the broadcast channel.
UPnP—Universal Plug and Play
PnP—Plug and play
HNB-GW—HNB Gateway. A gateway that provides core network connectivity for HNBs.
REM—Radio Environment Monitoring. A HNB performs REM scans to discover its neighbors.
SIB—System Information Blocks. SIBs are broadcast by a HNB on the broadcast channel and include control information for the handsets.
UUID—Universally Unique Id. UPnP devices are uniquely identified by a UUID.
UE—User Equipment, e.g., a handset.
PSC—Primary Scrambling Code. A physical identity on the HNB, which may be reused by geographically distant/separated HNBs.
UDP—User Datagram Protocol. A transport layer protocol for use with an internet protocol ("IP") protocol suite.
RNC Id—Radio Network Control Id. A unique numerical Id of the HNB-GW within a network.
SCTP—Stream Control Transmission Protocol. A transport layer protocol for use with the IP protocol suite.
Cell Identity—A unique numerical identity for the HNB within the network.

SUMMARY

Described herein is an enterprise network configuration that enables graduated, scalable, and flexible deployment of femto cells, by allowing a radio node to be a controller either temporarily or permanently, e.g., when it is serving a handset. The enterprise network enables decentralized handover processes, and may do so without a designated centralized controller responsible for managing handovers. Also described are methods by which the enterprise network auto-configures itself, e.g., through a self-discovery process, and implements handovers.

In one aspect of the present disclosure, a method for configuring a network, comprises: receiving, from a first radio node in the network, network information associated with one or more second radio nodes in the network; generating a network relation table, the network relation table comprising network information associated with the first radio node and the one or more second radio nodes; and performing a handoff to a third radio node in the network using the network relation table.

Implementations of the disclosure may include one or more of the following features. In some implementations, the third radio node comprises one of (i) the first radio node; or (ii) the one or more second radio nodes. The method further comprises sending, to the first radio node, a request for network information associated with the one or more second radio nodes in the network.

In other implementations, the network relation table comprises a routing table. The method also comprises receiving, from the first radio node through a radio interface, information identifying the first radio node as being in the network. The method additionally comprises using a network protocol to identify the first radio node as being in the network.

In still other implementations, the handoff comprises one of a soft handoff or a hard handoff, the handoff is executed through a direct communication link within the network, and the handoff is initiated following a detection, by the first radio node, of one or more of (i) a need to load balance the network, (ii) a need to maintain interference and power limits within the network, and (iii) one or more measurement reports received from a handset. The method also comprises automatically organizing one or more operational parameters based on information received about the third radio node in the network.

In another aspect of the disclosure, one or more machine-readable media are configured to store instructions that are executable by one or more processing devices to perform functions comprising: receiving, from a first radio node in the network, network information associated with one or more second radio nodes in the network; generating a network relation table, the network relation table comprising network information associated with the first radio node and the one or more second radio nodes; and performing a handoff to a third radio node in the network using the network relation table. Implementations of this aspect of the present disclosure can include one or more of the foregoing features.

In still another aspect of the disclosure, a system for configuring a network comprises a first radio device, in the network, configured to receive signals from a second radio device, in the network, and to transmit signals to the second radio device, the first radio device being configured to: receive, from a second radio node in the network, network information associated with one or more third radio nodes in the network; generate a network relation table, the network relation table comprising network information associated with the second radio node and the one or more third radio nodes; and perform a handoff to a fourth radio node in the network using the network relation table. Implementations of this aspect of the present disclosure can include one or more of the foregoing features.

Advantages of particular implementations include one or more of the following. Femto cells may be deployed within an enterprise network in an ad-hoc, scalable manner, without manual configuration, e.g., by an engineer or a technician, and optionally with or without a designated central controller. As the enterprise network grows, each node in the enterprise network learns of the other nodes in the enterprise network through an auto-configuration process.

DETAILED DESCRIPTION

Figure 1:
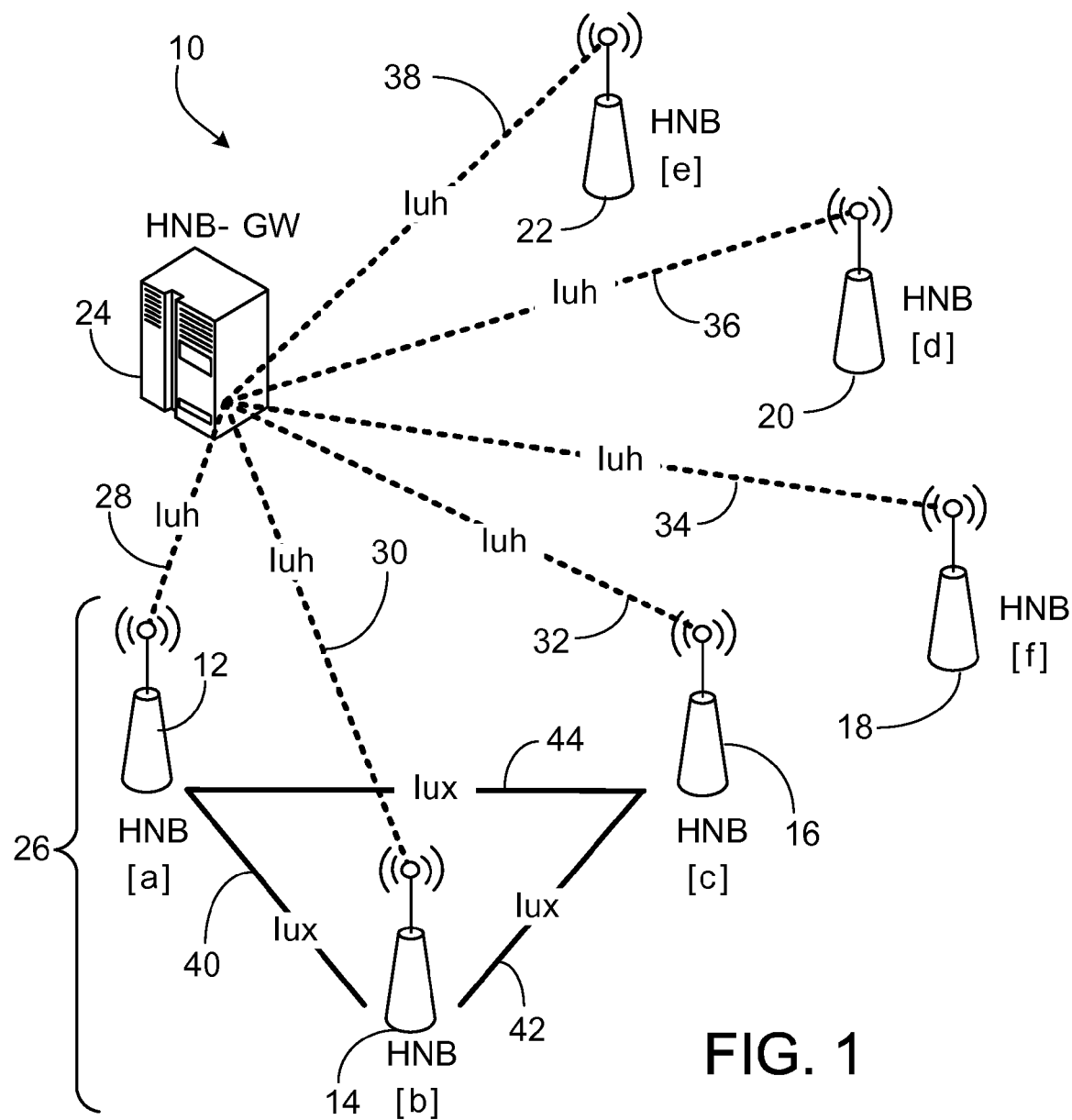
FIG. 1 is a block diagram of a communications network.

Referring to FIG. 1, a communication network 10 includes radio nodes 12, 14, 16, 18, 20, 22 (HNB [a-f]) in wireless communication with a gateway 24 (HNB-GW). A radio node 12, 14, 16, 18, 20, 22 may also be referred to as a "home base station," a "base station," or a "home node B." Radio nodes 12, 14, 16 (HNB [a-c]) belong to an enterprise network 26, while radio nodes 18, 20, 22 (HNB [e-f]) are private residential nodes, e.g., in different houses. Depending on the number of radio nodes in the enterprise network 26 and the configuration of the radio nodes in the enterprise network 26, the enterprise network may have a mesh configuration, a star configuration, or any combination thereof. Though an interface (e.g., an Iuh interface, a 3GPP interface, a standardized interface, a proprietary interface, and so forth), the network 10 establishes communication links 28, 30, 32, 34, 36, 38 between the gateway and the radio nodes 12, 14, 16, 18, 20, 22. The enterprise network 26 uses an interface (e.g., an Iux interface, a standardized interface, a proprietary interface, and so forth) to establish links 40, 42, 44 between the radio nodes 12, 14, 16 (HNB [a-c]).

Radio nodes 12, 14, 16 (HNB [a-c]) are assigned a group identifier, e.g., a CSG-Id, to identify the network associated with the radio nodes 12, 14, 16. Radio nodes 12, 14, 16 belonging to the same enterprise network (e.g., enterprise network 26) are assigned the same CSG-Id.

The enterprise network 26 is configured by a discovery process (e.g., an autonomous recognition process) performed both in the radio domain and in the network domain. Through the discovery process, a control point radio node (i.e., a radio node that is servicing a handset) identifies network information (e.g., routing information, CSG-Id information, PSC information, and so forth) associated with its "neighboring radio nodes," radio nodes that are within the radio range, and/or the network range of the control point radio node. The control point radio node also identifies network information associated with its "neighbors' neighbors radio nodes," radio nodes that are within the radio range, and/or the network range of the neighboring radio nodes. Based on the discovered network information, the control point radio nodes generates and updates a network relation table ("NRT"), e.g., a table that includes network information for the radio nodes (e.g., neighboring radio nodes and neighbors' neighbors radio nodes) of an enterprise network.

Figure 2:
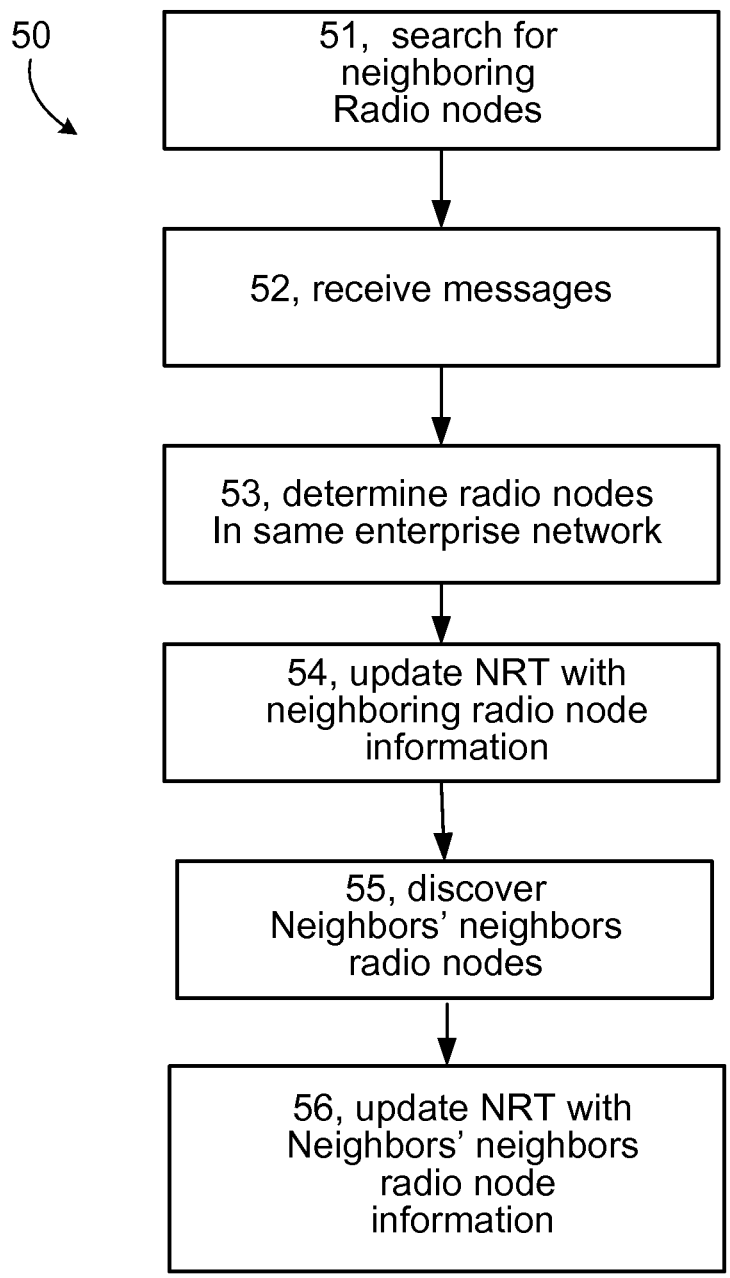
FIG. 2 is a flow chart of processes used by the communications network.

Referring to FIG. 2, a control point radio node (e.g., radio nodes 12, 14, 16) generates (50) a NRT as follows. The control point radio node searches (51) the radio domain and the network domain for neighboring radio nodes, as discussed in further detail below. The control point radio node receives (52) messages including group identifier information for the neighboring radio nodes. The control point radio node determines (53) the neighboring radio nodes belonging to the same enterprise network by comparing the group identifier of the neighboring radio nodes to the group identifier of the control point radio node. The control point radio node updates (54) its NRT with network information for the neighboring radio nodes in the same enterprise network. The control point radio node discovers (55) its neighbors' neighbors radio nodes by receiving the NRTs of the neighboring radio nodes ("neighboring NRTs") in the same enterprise network. The neighboring NRTs include network information for the neighbors' neighbors radio nodes, as discussed in further detail below. The control point radio node updates (56) its NRT with the network information of its neighbors' neighbors radio nodes.

Referring to FIG. 2, a radio node searches (51) for neighboring radio nodes in the radio domain and in the network domain, as follows. In the radio domain, a radio node uses a radio interface to "broadcast" its group identifier to other radio nodes. A radio node that broadcasts its group identifier is referred to as a "broadcast radio node." A radio node may broadcast its group identifier through a broadcast message. A control point radio node receives (52) (e.g., by intercepting) the broadcast messages to determine the broadcast radio nodes belonging to the same network as the control point radio node.

In one particular embodiment, a control point radio node performs REM scans, e.g., when the control point radio node turns on and/or periodically thereafter, to intercept broadcast messages (e.g., SIB#3 messages) of the broadcast radio notes. The broadcast messages include a group identifier (e.g., CSG-Id) of the broadcast radio nodes. By comparing the group identifier of the broadcast radio nodes to the group identifier of the control point radio node, the control point radio node identifies (53) neighboring radio nodes that belong to the same enterprise network as the control point radio node. When the control point radio node identifies a broadcast radio node that belongs to the same enterprise network, i.e., the CSG-Id of the broadcast radio node matches the CSG-Id of the control point radio node, the control point radio node records the identity and network information of the broadcast radio nodes in its NRT, as described in further detail below.

In some embodiments, a control point radio node instructs a handset to search for neighboring radio nodes by sending a message (i.e., an information request message) using a network protocol to the other radio nodes in the enterprise network. The message is broadcast to the radio nodes in the enterprise network. The message includes network information of the control point radio node. A radio node, receiving the message, compares its group identifier to the group identifier included in the message. If the radio node determines that the group identifiers match, the radio node sends the control point radio node a response message indicating that the radio node belongs to the same enterprise network as the control point radio node.

In the network domain, a control point radio node searches (51) for neighboring radio nodes by sending "request messages" (e.g., through use of a Simple Service Discovery Protocol ("SSDP"), UPnP discovery process, and so forth) to radio nodes within the network range of the control point radio node. Because the address (e.g., the Transport Network Layer address) of the other radio nodes is unknown to the control point radio node, the search is a "multicast" search in which requests for network information are simultaneously sent to multiple nodes in the network. Through the search, the control point radio node receives (52) the unique identifiers of other radio nodes ("discovered radio nodes") and devices on the network side. The unique identifier may be in the form of an UUID. An example of the UUID format is included in Table 1 below.

TABLE 1

Byte Format: [4 bytes]-[4 bytes]-[2 bytes]-[2 bytes]-[2 byte]-[1 byte]-[1 byte]
Content Format: [Cell Identity]-[CSG Id]-[RNC-Id]-[SCTP port]-[PSC]-[version]-[reserved]
Example: 123A324D-67AFB34C-2001-25A0-0072-01-00

The UUID includes network information (e.g., Cell Identity information, CSG-Id information, RNC-Id information, maximum load and current load information, interference and power related information and so forth) that is used by the control point radio node in updating its NRT, as described in further detail below. For example, the UUID includes a "CSG-Id" field, which is used by the control point radio node to identify (53) neighboring radio nodes associated with the same CSG-Id as the control point radio node. The UUID also includes a "SCTP port" field, which indicates the port through which the control point radio node may establish a connection with a discovered radio node.

Additionally, through the search, the control point radio node receives (52) "discovery messages" (e.g., UDP messages) from the discovered radio nodes. The discovery messages include a uniform resource location ("URL"), from which the control point radio node may retrieve a description of the discovered radio node, and an IP address of the discovered radio node. The IP address of the discovered radio node is used by the control point radio node in communicating with the discovered radio node and is stored in the NRT of the control point radio node. For example, using the IP address of the neighboring radio nodes, the control point radio node requests the NRTs of the neighboring radio nodes, as described in further detail below.

Referring back to FIG. 2, control point radio node updates (54) its NRT with network information (e.g., information included in the UUID and the discovery messages) for its neighboring radio nodes. An example NRT is shown below in Table 2.

TABLE 2

| Cell Identity | PSC | CSG-Id | IP address | SCTP port |
|---|---|---|---|---|
| 123456 | 4 | 123 | 104/24 | 7001 |
| 234567 | 3 | 123 | 102/24 | 7001 |
| 345678 | 6 | 123 | 103/24 | 7001 |

A NRT includes cell identity information, PSC information, CSG-Id information, IP address information and SCTP port information. The cell identity includes an identifier of a radio node that was discovered from radio scanning (e.g., REM) and also from a UUID received from the network through the discovery process. CSG-Id designates a group, e.g., enterprise, to which a radio node belongs. PSC designates a physical identity of a radio node. The IP address field includes a radio node's IP address. The SCTP port field includes a number that defines a communications port of a radio node. A radio node stores its NRT and updates its NRT, for example, during a scheduled and/or "periodic" REM scan or when another neighboring radio node is discovered.

Still referring back to FIG. 2, the control point radio node discovers (55) its neighbors' neighbors by receiving the NRTs of its neighboring radio nodes (i.e., neighboring NRTs). Through the network information included in the neighboring NRTs, the control point radio node "sees" (i.e., identifies) other radio nodes that are not otherwise "visible" (e.g., are outside the radio range and/or the network range) to the control point radio node. The control point radio node builds 56 a comprehensive mapping of the radio nodes belonging to the same enterprise network as the control point radio node by adding (56) the neighboring NRTs to the NRT of the control point radio node.

In one particular embodiment, radio node 12 (FIG. 1) is a control point radio node. Through radio and/or network searching, radio node 12 discovers radio node 14 and receives the UUID of radio node 14. Using the SCTP-port information included in the UUID of radio node 14, radio node 12 establishes a SCTP connection with radio node 14. Based on the information included in the UUID of radio node 14 and the discovery messages received from radio node 14, radio node 12 updates its NRT with the network information associated with radio node 14. Radio node 14 also updates its NRT with the network information associated with radio node 12.

Through the connection, radio node 12 and radio node 14 exchange NRTs. Radio node 12 receives the NRT of radio node 14. Radio node 14 receives the NRT of radio node 12. Radio node 12 updates its NRT with the network information included in the NRT of radio node 14. Radio node 14 updates its NRT with the network information included in the NRT of radio node 12.

Through the SCTP connection, radio node 12 receives "heart beat" messages from radio node 14. The heart beat messages indicate the existence of a connection between radio node 12 and radio node 14. When radio node 12 stops receiving heart beat messages from radio node 14, radio node 12 removes radio node 14 and the neighboring radio nodes of radio node 14 from its NRT. Radio node 12 also removes radio node 14 and the neighboring radio nodes of radio node 14 from its NRT when a subsequent REM scan indicates that radio node 14 has been deactivated.

Figure 3:
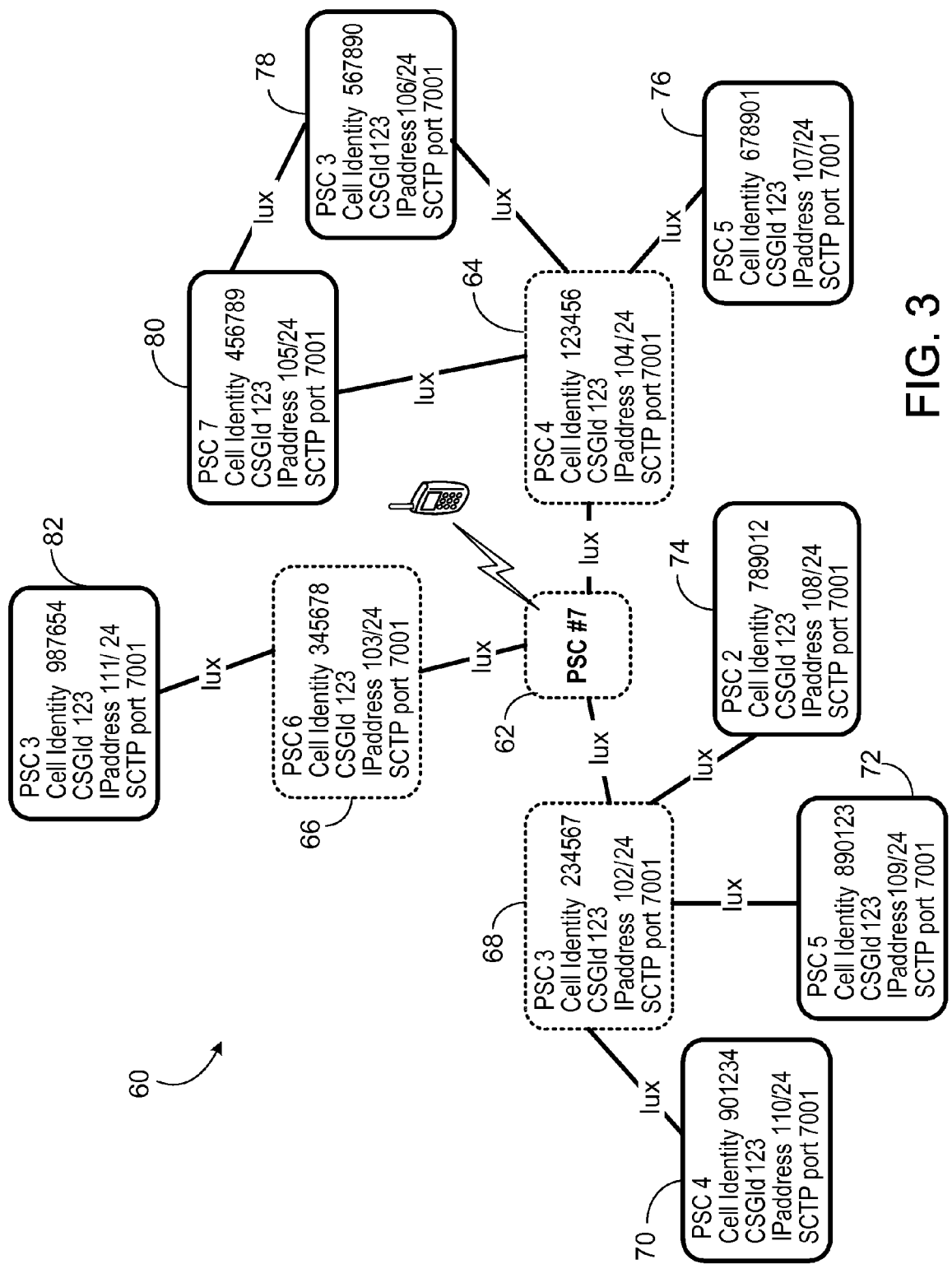
FIG. 3 is a block diagram of an enterprise network.

Referring to FIG. 3, an example of a self-discovered enterprise network 60 is shown. The network 60 includes radio nodes 62, 64, 66, 68, 70, 72, 74, 76, 78, 80, 82 having different scrambling codes and IP addresses. The radio nodes 62, 64, 66, 68, 70, 72, 74, 76, 78, 80, 82 are associated with the same CSG-Id, belong to the same enterprise network, and are connected to each other through communication links (e.g., Iux links). Through radio scanning and network searching, radio node 62 locates neighboring radio nodes 64, 66, 68 and updates its NRT with the network information associated with the neighboring radio nodes 64, 66, 68.

Figure 4:
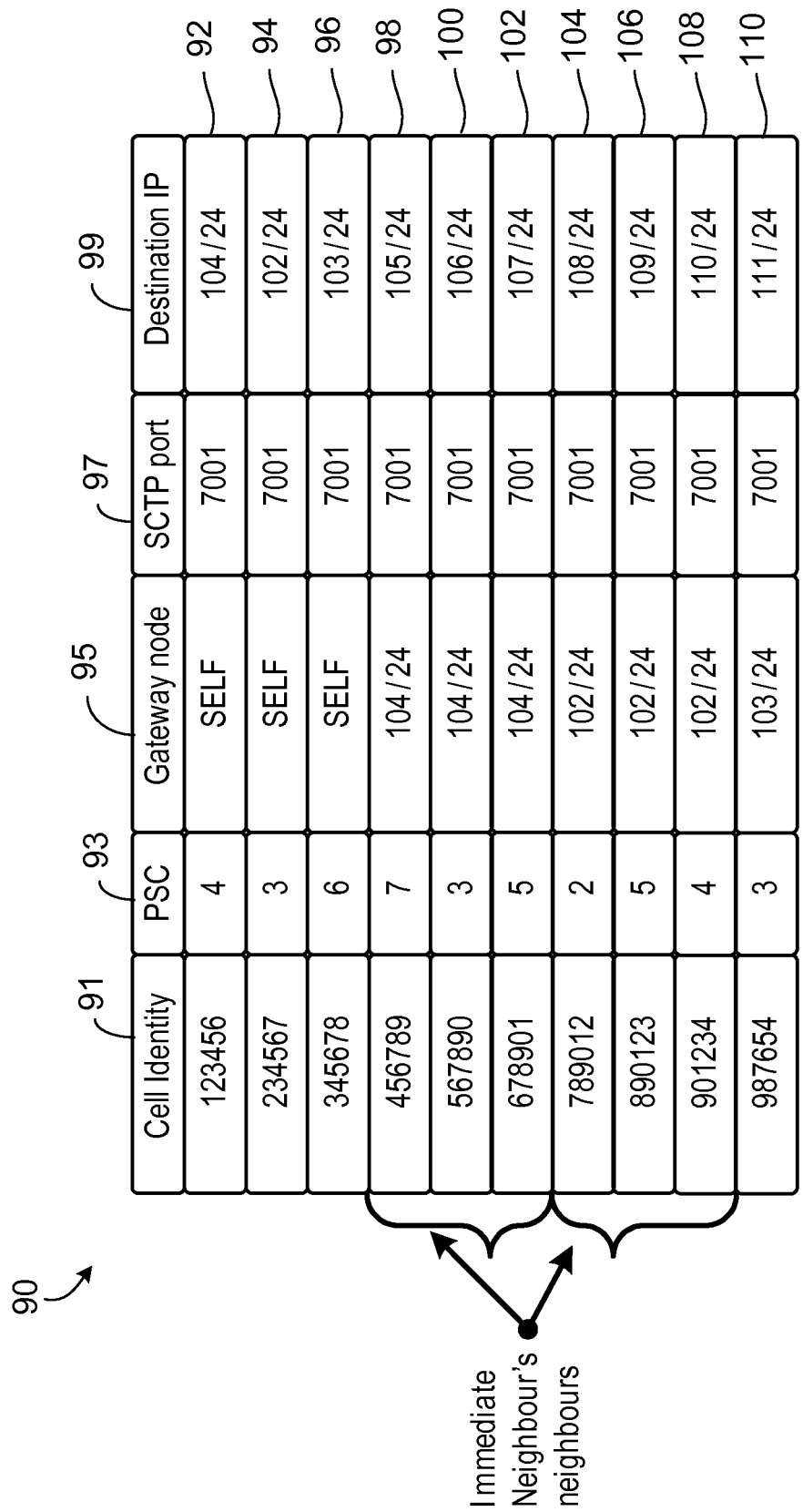
FIG. 4 is a diagram of a network relation table.

Referring to FIG. 4, an example NRT 90 is shown. The NRT includes columns 91, 93, 95, 97, 99 corresponding to various types of network information (e.g., cell identity information, PSC information, gateway node information, SCTP port information and destination IP information). Entries 92, 94, 96 correspond to the network information associated with neighboring radio nodes 64, 66, and 68. As new radio nodes cells are added to the network, radio node 62 discovers more neighboring radio nodes and updates its NRT accordingly.

Referring back to FIG. 3, radio node 62 receives over a communication link (e.g., an Iux link) the NRT of neighboring radio node 64. The NRT of neighboring radio node 64 includes network information associated with radio nodes 76, 78 and 80 (i.e., the neighbors' neighbors radio nodes).

Through the NRT of neighboring radio node 64, radio node 62 learns of neighbors' neighbors radio nodes 76, 78 and 80. Radio node 62 updates its NRT with the network information associated with neighbors' neighbors radio nodes 76, 78 and 80. In FIG. 4, entries 98, 100 and 102 correspond to the network information associated with neighbors' neighbors radio nodes 76, 78 and 80.

Radio node 62 receives the NRT of neighboring radio node 68, which includes network information associated with neighbors' neighbors radio nodes 70, 72 and 74. In FIG. 4, entries 104, 106 and 108 correspond to the network information associated with neighbors' neighbors radio nodes 70, 72 and 74. Radio node 62 also receives the NRT of neighboring radio node 66, which includes network information associated with neighbors' neighbor radio node 82. In FIG. 4, entry 110 corresponds to the network information associated with neighbors' neighbor radio node 82.

Referring to FIGS. 5A-5D, an example of a handover process in a communications network 120 is shown. The communications network includes a gateway 124 (HNB-GW) and radio nodes 62, 64, 76 (see also FIG. 3). Referring to FIG. 3, radio node 64 is a neighboring radio node of radio node 62 and radio node 76 is a neighbors' neighbor radio node of radio node 62. Radio nodes 62, 64, 76 are connected to gateway 124 through Iuh interface links 126, 127, 129. Radio nodes 62, 64, 76 are connected to each other through Iux interface links 128, 131.

Figure 5A:
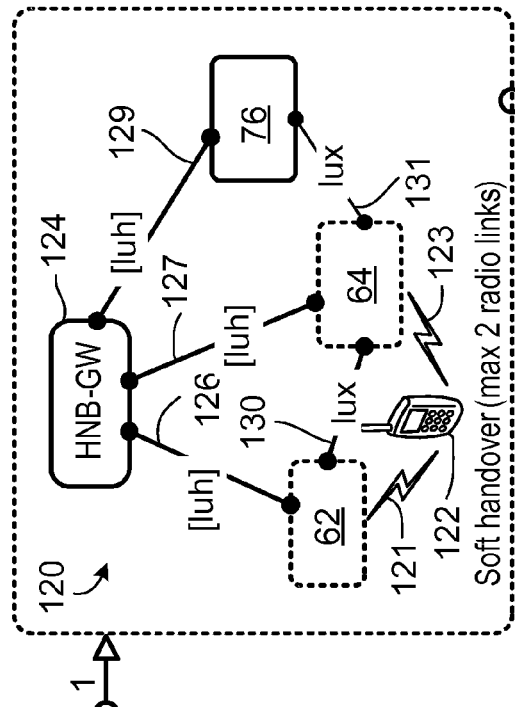
FIGS. 5A-5D are diagrams of a handover process.
Figure 5B:
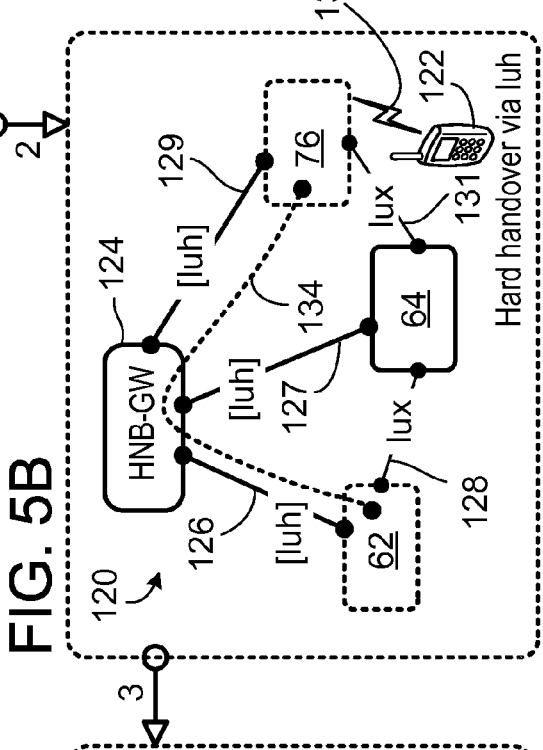

Referring to FIG. 5A, a handset 122 is connected to radio node 62 through an active communication link (not shown). Handset 122 moves from radio node 62 towards neighboring radio node 64. Referring to FIG. 5B, to maintain a communication on the handset 122, radio node 62 retrieves from its NRT network information for neighboring radio node 64 and sets up a soft handover link 130 (which may also be link 128) to the neighboring radio node 64. Through the soft handover link 130, the handset communicates with both radio node 62 and neighboring radio node 64 over communication links 121, 123. Radio node 62 retains control of the communication during and/or after the soft handover, because radio node 62 is acting as a control point radio node.

Figure 5C:
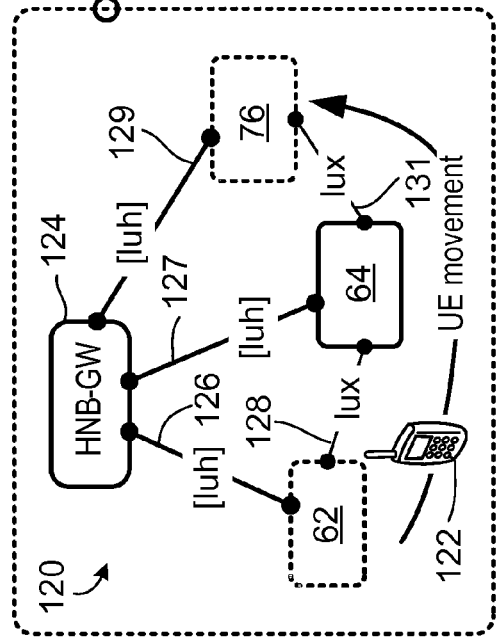
Figure 5D:
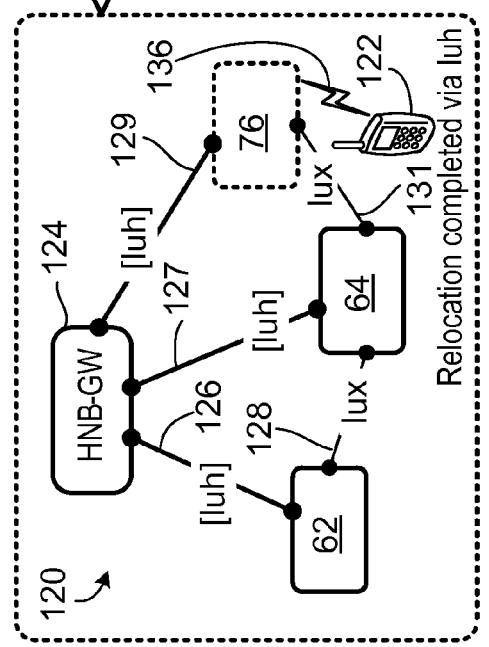

Referring to FIG. 5C, the handset 122 moves away from neighboring radio node 64 toward neighbors' neighbor radio node 76. Radio node 62 acts as a control point radio node and retrieves from its NRT the network information for radio node 76 to establish a link 134 with neighbors' neighbor radio node 76. Through the link 134, radio node 62 initiates a hard handover to neighbors' neighbor radio node 76. In the hard handover, the call gets physically relocated to radio node 76. Referring the FIG. 5D, the handover finishes when the handset 122 attaches itself to radio node 76 through link 136.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

The term "machine-readable storage media" is not meant to encompass non-statutory subject matter as defined at the time the attached claims are construed. The term "machine-readable storage media", however, is meant to cover any subject matter which is defined as statutory at the times the claims are construed.

A number of embodiments have been described. Nevertheless, it will be understood that various modifications may be made and therefore other embodiments are within the scope of the following claims.

For example, techniques described herein may be implemented using CDMA (wideband and/or narrow band) and non-CDMA air interface technologies, as well as the 1xEV-DO air interface standard. Additionally, a radio node may update its NRT with information received from other devices, for example, a handset. The radio node may receive measurement reports from a handset indicating PSC and possible cell identities of neighboring radio nodes. The radio node updates its NRT using the measurement reports and the discovery messages from the neighboring radio nodes.

In another example, a first radio node that is deployed in an enterprise network is not a control point radio node and will not be able to discover other enterprise radio nodes in the area. In this example, the discovery process begins when a control point radio node joins the enterprise network.

What is claimed is:

1. A method for configuring a network, the method comprising:
   receiving, by a first radio node, information identifying a second radio node in the network, wherein the second radio node is configured to communicate with the first radio node, wherein the first radio node has a communication session with a mobile device at a first time, wherein the second radio node has the communication session with the mobile device at a second time, and wherein the first radio node differs from the second radio node;
   receiving, by the first radio node from the second radio node, information identifying one or more third radio nodes in the network that are within a communication range of the second radio node; and
   initiating, by the first radio node, a handoff of the communication session with the mobile device, from the second radio node to one of the one or more third radio nodes, using the information received from the second radio node that identifies the one or more third radio nodes in the network that are within the communication range of the second radio node.

2. The method of claim 1, further comprising:
   sending, to the second radio node, a request for network information associated with the one or more third radio nodes in the network.

3. The method of claim 1, further comprising:
   receiving, from the second radio node through a radio interface, information identifying the second radio node as being in the network.

4. The method of claim 1, further comprising:
   using a network protocol to identify the second radio node as being in the network.

5. The method of claim 1, wherein the handoff comprises one of a soft handoff or a hard handoff.

6. The method of claim 1, wherein the handoff is executed through a direct communication link within the network.

7. The method of claim 1, wherein the handoff is initiated following a detection, by the second radio node, of one or more of (i) a need to load balance the network, (ii) a need to maintain interference and power limits within the network, and (iii) one or more measurement reports received from a handset.

8. A system comprising:
a first radio node; and
one or more machine-readable hardware storage devices storing instructions that are executable by the first radio node to perform operations comprising:
receiving, by the first radio node, information identifying a second radio node in the network, wherein the second radio node is configured to communicate with the first radio node, wherein the first radio node has a communication session with a mobile device at a first time, wherein the second radio node has the communication session with the mobile device at a second time, and wherein the first radio node differs from the second radio node;
receiving, by the first radio node from the second radio node, information identifying one or more third radio nodes in the network that are within a communication range of the second radio node; and
initiating, by the first radio node, a handoff of the communication session with the mobile device, from the second radio node to one of the one or more third radio nodes, using the information received from the second radio node that identifies the one or more third radio nodes in the network that are within the communication range of the second radio node.

9. The system of claim 8, wherein the operations further comprise:
sending, to the second radio node, a request for network information associated with the one or more third radio nodes in the network.

10. The system of claim 8, wherein the operations further comprise:
receiving, from the second radio node through a radio interface, information identifying the second radio node as being in the network.

11. The system of claim 8, wherein the operations further comprise:
using a network protocol to identify the second radio node as being in the network.

12. The system of claim 8, wherein the handoff comprises one of a soft handoff or a hard handoff.

13. The system of claim 8, wherein the handoff is executed through a direct communication link within the network.

14. The system of claim 8, wherein the handoff is initiated following a detection, by the second radio node, of one or more of (i) a need to load balance the network, (ii) a need to maintain interference and power limits within the network, and (iii) one or more measurement reports received from a handset.

15. One or more machine-readable hardware storage devices storing instructions that are executable by a first radio node to perform operations comprising:
receiving, by the first radio node, information identifying a second radio node in the network, wherein the second radio node is configured to communicate with the first radio node, wherein the first radio node has a communication session with a mobile device at a first time, wherein the second radio node has the communication session with the mobile device at a second time, and wherein the first radio node differs from the second radio node;
receiving, by the first radio node from the second radio node, information identifying one or more third radio nodes in the network that are within a communication range of the second radio node; and
initiating, by the first radio node, a handoff of the communication session with the mobile device, from the second radio node to one of the one or more third radio nodes, using the information received from the second radio node that identifies the one or more third radio nodes in the network that are within the communication range of the second radio node.

16. The one or more machine-readable hardware storage devices of claim 15, wherein the operations further comprise:
sending, to the second radio node, a request for network information associated with the one or more third radio nodes in the network.

17. The one or more machine-readable hardware storage devices of claim 15, wherein the operations further comprise:
receiving, from the second radio node through a radio interface, information identifying the second radio node as being in the network.

18. The one or more machine-readable hardware storage devices of claim 15, wherein the operations further comprise:
using a network protocol to identify the second radio node as being in the network.

19. The one or more machine-readable hardware storage devices of claim 15, wherein the handoff comprises one of a soft handoff or a hard handoff.

20. The one or more machine-readable hardware storage devices of claim 15, wherein the handoff is executed through a direct communication link within the network.

* * * * *